United States Patent
Mullay et al.

(10) Patent No.: US 7,857,899 B2
(45) Date of Patent: Dec. 28, 2010

(54) EMULSION COMPOSITION AND VEHICLE AND INK COMPOSITIONS AND PRINTING PROCESS AND METHOD THEREOF

(75) Inventors: John J. Mullay, Mentor, OH (US); John H. Larsen, Woodridge, IL (US); Joshua M. Rosenheck, Concord, OH (US); George A. Malchow, Jr., Mentor-on-the-Lake, OH (US); Robert A. Pollack, Katy, TX (US); Harshida C. Dave, Highland Heights, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 929 days.

(21) Appl. No.: 11/568,994

(22) PCT Filed: May 20, 2005

(86) PCT No.: PCT/US2005/017951

§ 371 (c)(1),
(2), (4) Date: Jan. 16, 2007

(87) PCT Pub. No.: WO2005/113694

PCT Pub. Date: Dec. 1, 2005

(65) Prior Publication Data

US 2008/0241389 A1   Oct. 2, 2008

Related U.S. Application Data

(60) Provisional application No. 60/573,467, filed on May 21, 2004.

(51) Int. Cl.
*C09D 11/02* (2006.01)
(52) U.S. Cl. .................................. 106/31.25
(58) Field of Classification Search ............. 106/31.25
See application file for complete search history.

(56) References Cited

U.S. PATENT DOCUMENTS

| | | | | |
|---|---|---|---|---|
| 3,865,588 A | * | 2/1975 | Ohto et al. | 430/18 |
| 4,385,149 A | * | 5/1983 | Tsuchiya et al. | 524/313 |
| 5,389,130 A | | 2/1995 | Batlaw et al. | |
| 6,063,835 A | * | 5/2000 | Ohshima et al. | 523/161 |
| 6,066,199 A | | 5/2000 | Adams et al. | |
| 6,432,183 B1 | * | 8/2002 | Kabalnov | 106/31.25 |

* cited by examiner

*Primary Examiner*—Jessica L Ward
*Assistant Examiner*—Veronica Faison Gee
(74) *Attorney, Agent, or Firm*—Samuel B. Laferty; David M. Shold

(57) ABSTRACT

An emulsion composition comprises water, a hydrocarbon distillate having a boiling point of 215 to 325° C., and a surfactant having a hydrophilic lipophilic balance number of 10 or less. A vehicle composition, an ink composition, a lithographic printing process and a method to improve a lithographic printing process comprise the emulsion composition which when used in a lithographic printing ink can reduce emission of volatile organic compounds and reduce the time at start-up to establish print quality.

13 Claims, No Drawings

EMULSION COMPOSITION AND VEHICLE AND INK COMPOSITIONS AND PRINTING PROCESS AND METHOD THEREOF

CROSS REFERENCE

This application claims priority from U.S. Provisional Application 60/573,467 filed May 21, 2004.

BACKGROUND OF THE INVENTION

1. Field of the Invention

The present invention involves a stable emulsion composition of water and a high boiling hydrocarbon distillate and vehicle and ink compositions containing the emulsion composition. A printing process is improved when it includes the emulsion composition.

2. Description of the Related Art

Industrial processes that involve the emission of volatile organic compounds (VOC) are being required by governmental regulations to reduce these emissions due to health and environmental concerns.

The printing industry uses volatile organic compounds generally as solvents in ink compositions. Printing methods that result in the emission of solvents, especially those in which solvent evaporation is used to dry the ink, can benefit from technology that reduces VOC emissions. Both letterpress and lithographic printing can employ evaporation of the solvent to dry an ink. Because letterpress printing is less convenient, more time consuming and more costly than lithographic printing in the preparation of printing plates for the printing press, lithographic printing has become the leading method for publication and commercial printing and an important method for printing packaging materials.

Lithographic printing is a complex process. The printing plate or plate cylinder for lithographic printing is a flat surface, not a raised or recessed surface. The plate cylinder contains an image area which is ink receptive. The image area can be generated by several methods to include a photographic process and a computer-to-plate process in which a sensitive coating on the plate is developed in the image area while in the nonimage area the coating is washed away leaving the nonimage area hydrophilic or water receptive. In a normal lithographic printing process the nonimage area on the plate cylinder is first wetted with an aqueous dampening solution rendering it nonreceptive to ink. Ink is then transferred to the image area on the plate cylinder. In direct lithographic printing the ink is transferred from the plate cylinder directly to the substrate being printed such as paper while in offset lithographic printing the ink is initially transferred to a rubber blanket cylinder and then to the substrate. Offset printing has advantages including that it provides an even image on an uneven substrate. Because of the complex process involved in lithographic printing, the ink must have certain properties on the printing press to include a certain tack or stickiness and viscosity or resistance to flow that allow transfer of the ink at the high speeds of a printing press and that result in an undamaged substrate having a image of proper intensity and definition.

DeSanto, Jr. et al. in U.S. Pat. No. 4,981,517 disclose a printing ink emulsion system containing an oil-based phase and water-miscible phase and exhibiting a high degree of stability against phase separation in use.

Koike et al. in U.S. Pat. No. 5,378,739 disclose a W/O emulsion ink for use in stencil printing which is composed of an oil phase and a water phase with the respective ratios by wt. % thereof being (20 to 40):(80 to 60).

Batlaw et al. in U.S. Pat. No. 5,389,130 disclose an ink composition for Gravure printing wherein the vehicle is a water-in-oil emulsion of a water immiscible organic phase and an aqueous phase in the range of 9:1 to 1:1 thereby significantly reducing VOC emissions with no detrimental effect on print quality.

Kingman et al. in U.S. Pat. No. 6,140,392 disclose single fluid lithographic printing inks that include a continuous phase and a discontinuous polyol phase.

Ohshima et al. in U.S. Pat. No. 6,348,519 disclose an emulsion ink, by which clear images are produced, having excellent drying and fixing properties and preservation stability and does not bleed, strike through or leak.

Unexpectedly it has now been found that an ink containing a water-in-oil emulsion, in which the water in the emulsion replaces organic solvent normally present in the ink, can be used in a lithographic printing process to produce a print equivalent in quality to print from a conventional lithographic ink. A lithographic process using an ink that contains this water-in-oil emulsion is improved in performance in several ways. Emissions of VOC can be reduced by an amount equal to the amount of organic solvent eliminated by using the emulsion. The evaporation step to dry the ink can result in a lower oven temperature since water generally boils at a lower temperature than the organic solvent which may also result in less energy being needed to dry the ink. A lithographic printing press run that uses an ink containing a water-in-oil emulsion meets print quality standards sooner compared to a run using a conventional lithographic ink which is advantageous timewise, energywise and in reducing substrate wastage.

SUMMARY OF THE INVENTION

An object of the present invention is to reduce the emission of VOC in a printing process.

Another object of this invention is to improve a lithographic printing process.

A further object of the invention is to reduce the emission of VOC in a lithographic printing process.

An additional object of the present invention is to reduce the temperature required to dry the ink in a lithographic process.

A further object of the present invention is to reduce the time required to meet print quality standards in a lithographic process.

A still further object of the invention is to reduce time, energy and substrate usage required in a lithographic process.

Additional objects and advantages of the present invention will be set forth in the Detailed Description which follows and, in part, will be obvious from the Detailed Description or may be learned by the practice of the invention. The objects and advantages of the invention may be realized by means of the instrumentalities and combinations pointed out in the appended claims.

To achieve the foregoing objects in accordance with the present invention as described and claimed herein, an emulsion composition comprises (a) water;

(b) a hydrocarbon distillate having a boiling point range of 215 to 325° C.; and (c) at least one emulsion stabilizing surfactant having a HLB (hydrophilic lipophilic balance) value of 10 or less;

wherein the water is present at 10 to 99% by weight, the hydrocarbon distillate is present at less than 90% by weight, and the surfactant is present at 0.1 to 10% by weight.

In another embodiment of the invention a vehicle composition comprises
- an emulsion composition as described hereinabove and throughout this application; and
- a resin;

wherein the emulsion composition is present at 6 to 99% by weight, and the resin is suitable for use in a printing ink composition and is present at 1 to 70% by weight.

In a further embodiment of this invention an ink composition comprises
- an emulsion composition as described hereinabove and throughout this application;
- a resin; and
- a colorant wherein the emulsion composition delivers 5 to 35% by weight water to the ink composition.

In an additional embodiment of the invention a lithographic printing process comprises
- employing in the printing process an ink composition comprising an emulsion composition as described hereinabove and throughout this application.

A still further embodiment of the invention is a method to improve a lithographic printing process, comprising
- employing in the printing process an ink composition comprising an emulsion composition as described hereinabove and throughout this application.

DETAILED DESCRIPTION OF THE INVENTION

The present invention comprises an emulsion composition comprising:
(a) water;
(b) a hydrocarbon distillate having a boiling point range of 215 to 325° C.; and
(c) at least one emulsion stabilizing surfactant having a HLB value of 10 or less wherein the water is present at 10 to 99% by weight, the hydrocarbon distillate is present at less than 90% by weight, and the surfactant is present at 0.1 to 10% by weight.

The water component (a) of the emulsion composition can comprise water from any source that allows formation of the emulsion and that can be used in a printing ink composition to include sanitized water from a water treatment facility and deionized water from treatment methods such as distillation, filtration and membrane osmosis. The water can be present in the emulsion composition on a weight basis at 10 to 99%, and in other embodiments at 40 to 98%, at 50 to 97%, and at 70 to 95%.

Component (b) of the emulsion composition can be an organic solvent. The organic solvent can comprise at least one hydrocarbon, at least one nonhydrocarbon, or a mixture thereof. The nonhydrocarbon can include various oxygen-containing compounds. The oxygen-containing compounds can include alcohols such as methanol and ethanol, ketones such as methyl ethyl ketone, esters of carboxylic acids such as ethyl acetate, glycol ethers such as alkyl and dialkyl ethers of ethylene glycol, nitroparaffins such as 2-nitropropane, or mixtures thereof. The hydrocarbon can include at least one aliphatic hydrocarbon, at least one aromatic hydrocarbon, or a mixture thereof. The hydrocarbon can be a hydrocarbon distillate generally obtained by fractional distillation of a mineral oil such as a petroleum oil. Aromatic hydrocarbons can include toluene, xylenes, and higher boiling compositions. Aliphatic hydrocarbons can include kerosene, mineral spirits, naphtha, Stoddard solvent, a heatset oil, or a mixture thereof. Heatset oils are fractionated, narrow-boiling hydrocarbons which are especially useful as solvents in lithographic and letterpress inks and which can consist entirely of saturated hydrocarbons or of a major amount of saturated hydrocarbons and minor amounts of olefins and/or aromatic hydrocarbons which are of the higher boiling composition type. The heatset oil can be on a weight basis 100% saturated hydrocarbons, and in other instances can include greater than 50%, 65%, or 80% or 90% saturated hydrocarbons. In an embodiment of the invention component (b) comprises a hydrocarbon distillate having a boiling point range of 215 to 325° C., and in other embodiments having a boiling point range of 225 to 320° C., or 230 to 280° C. or 260 to 320° C. In another embodiment of the invention component (b) comprises the hydrocarbon distillate as described hereinabove, and at least one other hydrocarbon as described above or at least one nonhydrocarbon as described above or a mixture thereof. In a further embodiment of the invention the hydrocarbon distillate as described hereinabove comprises a heatset oil which is suitable for use in a printing ink composition. In yet a further embodiment of the invention component (b) comprises a hydrocarbon distillate boiling in the 215 to 325° C. range to include a heatset oil, a drying oil, or a mixture thereof. Component (b) can be present in the emulsion composition on a weight basis at less than 90%, and in other instances at less than 60%, 50% or 30%. In other embodiments of the invention component (b) can be present in the emulsion composition on a weight basis at 0.5 to 89.9%, 1 to 49.9%, or 2 to 29.9%. The organic solvents of component (b) are available commercially. The hydrocarbon distillate and heatset oil of component (b) can be obtained from several manufacturers including Magie Bros. Oil Company, Division of Pennzoil Company.

Component (c) of the emulsion composition can be at least one emulsion stabilizing surfactant. The surfactant can be a compound or composition or a mixture of compounds and/or compositions that is capable of forming an emulsion with water and the organic solvent of the present invention which can comprise a hydrocarbon distillate boiling in the 215 to 325° C. range and that is compatible with the vehicle and ink compositions of the present invention. The surfactant can be an organic compound. The organic compound can be a cationic compound such as a quaternary ammonium salt, an anionic compound such as an alkali or alkaline earth metal salt of an alkylaryl sulfonate, an amphoteric compound such as a betaine inner salt that can contain a quaternary ammonium group and an anionic acid group such as a carboxylate or sulfonate or phosphate group, a nonionic compound such as an alkoxylated alcohol, or a mixture thereof. The surfactant can also be referred to as a detergent, an emulsifier or a wetting agent. The surfactant can have a hydrophilic lipophilic balance (HLB) number ranging from 0 to 60, 0 to 30, or 0 to 20. The HLB number is the relative attraction of the surfactant for the phases of an emulsion which are normally a polar aqueous phase and a nonpolar organic or oil phase. A surfactant having a low HLB number will have more of an attraction for the nonpolar organic or oil phase which favors the formation of a water-in-oil emulsion. A surfactant having a high HLB number will have more of an attraction for the polar aqueous phase which favors the formation of an oil-in-water emulsion. In an embodiment of the invention the emulsion stabilizing surfactant can have a HLB number of 10 or less, and in other instances of 9 or less, or 8 or less. In another embodiment of the invention the surfactant can have a HLB number of 0 to 10, and in other instances of 0 to 9, or 0 to 8. The emulsion composition of the present invention can be a water-in-oil emulsion or an oil-in-water emulsion. In an embodiment of the invention the emulsion composition is a water-in-oil emulsion. The water phase of the water-in-oil emulsion of the present invention can comprise droplets having a mean diameter of 0.1 to 10 microns, and in other instances of 0.3 to 8 microns, or 0.5 to 6 microns.

The surfactant of the present invention can comprise a reaction product of a hydrocarbyl-substituted acylating agent and an amine, an alcohol, or a mixture thereof; a Mannich reaction product of hydrocarbyl-substituted hydroxy-containing aromatic compound, an aldehyde, and an amine containing at least one primary or secondary amino group; a hydrocarbyl-substituted carboxylic acid; an alkoxylated alcohol, a carboxylate ester of an alkoxylated alcohol, or a mixture thereof; an alkoxylated alkylphenol, a carboxylate ester of an alkoxylated alkylphenol, or a mixture thereof; an alkoxylated fatty carboxylic acid, a carboxylate ester of an alkoxylated fatty carboxylic acid, or a mixture thereof; a fatty carboxylic acid ester; a polymer, copolymer or block copolymer of one or more alkylene oxides; an alkoxylated and/or carboxylated monosaccharide or disaccharide; an alkoxylated fatty carboxylic acid ester or vegetable oil or animal oil or mixture thereof; an amine; an alkoxylated amine; an amide; an alkoxylated amide; an alkanolamide; an alcohol to include for example fatty alcohols having 4 to 22 carbon atoms; a sulfonate to include sulfonated amines, sulfonated amides, olefin sulfonates, sulfonated oils, petroleum sulfonates, sulfonated fatty acids, sulfonates of alkoxylated alkylphenols, sulfonates of aromatic compounds and alkylated aromatic compounds such as for example sulfonates of benzene and naphthalene and toluene and dodecylbenzene and alkylated diphenyl ether, and mixtures thereof; an amine oxide; a betaine compound to include lecithin or a lecithin derivative; an imidazoline to include fatty acid based imidazolines and derivatives thereof; a phosphate ester to include derivatives thereof; lignin or a derivative thereof; a quaternary ammonium salt; a sulfate to include sulfates of alcohols, sulfates of alkoxylated alcohols, sulfates of alkoxylated alkylphenols, sulfates of oils, sulfates of fatty acids, sulfates of fatty esters, and mixtures thereof; a sulfosuccinate or a derivative thereof to include sulfosuccinamates; a soap such as a metal or ammonium salt of a carboxylic acid; a copolymer of a poly(oxyalkylene glycol) and a poly(12-hydroxystearic acid); or a mixture thereof. The mixture of surfactants can be two or more surfactants of the same type such as for example a mixture of two or more alkoxylated alcohols. The mixture of surfactants can be two or more surfactants of two or more different types such as for example a mixture of two alkoxylated alcohols and one alkoxylated alkylphenol or a mixture of one alkoxylated alcohol, one alkoxylated alkylphenol and one fatty carboxylic acid ester. The surfactants of this invention are available commercially and/or can be prepared by well known methods. The surfactants of this invention can include for example the commercially available emulsifiers and detergents that are described in *McCutcheon's Emulsifiers & Detergents*, North American and International Edition, 1993 Annuals, MC Publishing Company. This publication includes most of the surfactant types listed hereinabove.

In an embodiment of this invention the surfactant comprises a reaction product of a hydrocarbyl-substituted acylating agent and an amine, an alcohol, or a mixture thereof; a Mannich reaction product of hydrocarbyl-substituted hydroxy-containing aromatic compound, an aldehyde, and an amine containing at least one primary or secondary amino group; a hydrocarbyl-substituted carboxylic acid; an alkoxylated alcohol, a carboxylate ester of an alkoxylated alcohol, or a mixture thereof; an alkoxylated alkylphenol, a carboxylate ester of an alkoxylated alkylphenol, or a mixture thereof; an alkoxylated fatty carboxylic acid, a carboxylate ester of an alkoxylated fatty carboxylic acid, or a mixture thereof; a fatty carboxylic acid ester; a polymer, copolymer or block copolymer of one or more alkylene oxides; an alkoxylated and/or carboxylated monosaccharide or disaccharide; an alkoxylated fatty carboxylic acid ester or vegetable oil or animal oil or mixture; or a mixture thereof.

The surfactant can be a reaction product of a hydrocarbyl-substituted acylating agent and an amine and/or alcohol. The hydrocarbyl substituent of the reaction product of the hydrocarbyl-substituted acylating agent and amine, alcohol or mixture thereof can have a number average molecular weight of 110 to 5000, and in other instances of 140 to 3500, or 160 to 2500 or 500 to 1500. A hydrocarbyl group is a univalent group of one or more carbon atoms that is predominately hydrocarbon in nature, but can contain heteroatoms such as oxygen in the carbon chain and can have heteroatom-containing groups or atoms such as hydroxy, halo, nitro and alkoxy attached to the carbon chain. The hydrocarbyl substituent can be derived from an olefin or polyolefin. The polyolefin can be a homopolymer of a single $C_2$-$C_{10}$ olefin such as for example isobutylene or a copolymer of two or more $C_2$-$C_{10}$ olefins such as for example ethylene and propylene and optionally butadiene. In an embodiment of the invention the hydrocarbyl substituent is derived from a polyisobutylene which can have a vinylidene content of terminal double bonds that is low at 30% or less or that is high at 50% or more. The acylating agent can be derived from an alpha, beta-unsaturated monocarboxylic or polycarboxylic acid or reactive equivalent thereof to include an anhydride or an ester or an acid halide. Useful alpha, beta-unsaturated carboxylic acids or reactive equivalents thereof include for example methyl acrylate, ftumaric acid and maleic anhydride. In an embodiment of the invention the alpha, beta-unsaturated carboxylic acid or reactive equivalent thereof is maleic anhydride. Methods to prepare a hydrocarbyl-substituted acylating agent are well known and generally involve for example heating a polyisobutylene or chlorinated polyisobutylene and maleic anhydride at 150 to 250° C. optionally in the presence of a promoter such as chlorine. The amine can be a monoamine, a polyamine or a mixture thereof. The amine can have primary amino groups, secondary amino groups, tertiary amino groups, or a mixture thereof. The amine can be an alkanolamine that contains one or more hydroxy groups. In an embodiment of the invention the amine is an alkanolamine, and in another embodiment the alkanolamine is a N,N-dialkylalkanolamine. Useful amines include for example ethanolamine, diethanolamine, triethanolamine, and N,N-diethylethanolamine. The alcohol can be a monohydric or polyhydric alcohol. The hydrocarbyl-substituted acylating agent and amine and/or alcohol can be reacted in a ratio based on acyl equivalents to equivalents of reactive amino groups and/or hydroxy groups that is respectively 1:0.3-5, and in other instances is 1:0.5-4.5, or 1:1.5-4.5 or 1:0.5-2.5. The reactive amino and/or hydroxy groups on an equivalent basis for example in N,N-diethylethanolamine are 2 and in ethanolamine can be 2 or 3. The reaction product of a hydrocarbyl-substituted acylating agent and amine and/or alcohol can be prepared by heating the reactants at 50 to 200° C. and as described in U.S. Pat. No. 5,334,318.

The surfactant can be a Mannich reaction product. The hydrocarbyl substituent of the hydrocarbyl-substituted hydroxy-containing aromatic compound of the Mannich reaction product can have a number average molecular weight of 50 to 5000, 80 to 3000, or 110 to 800 or 750 to 2300. The hydrocarbyl substituent can be derived from a polyolefin as described hereinabove for the reaction product of the hydrocarbyl-substituted acylating agent and amine and/or alcohol. In an embodiment of the invention the hydrocarbyl substituent of the hydrocarbyl-substituted hydroxy-containing aromatic compound is derived from a polyisobutylene, and in other embodiments the polyisobutylene has a terminal double bond or vinylidene content that is 30% or less, or 50% or more. The hydroxy-containing aromatic compound can be derived from a phenolic compound containing one or more hydroxy groups such as for example phenol or catechol and can contain a $C_1$-$C_3$ alkyl group such as for example o-cresol. The aldehyde of the Mannich reaction product can be a $C_1$-$C_6$ aldehyde such as for example formaldehyde and reactive equivalents thereof. The amine of the Mannich reaction product can be an amine that contains at least one primary or secondary amino group that is capable of undergoing a Mannich reaction. The amine can be ammonia, a monoamine, a polyamine, or a mixture thereof. The amine can be an alkanolamine that contains one or more hydroxy groups. Useful amines include for example dimethylamine, ethylenediamine, ethanolamine and diethanolamine. The hydrocarbyl-substituted hydroxy-containing aromatic compound, aldehyde and amine can be reacted in a mole ratio that is respectively 1:0.5-1.5:0.5-1.5. In an embodiment of the invention the Mannich reaction product is prepared from a hydrocarbyl-substituted phenol, formaldehyde and diethanolamine where the hydrocarbyl substituent is derived from a polyisobutylene. Methods to prepare a Mannich reaction product are well known and generally involve an acid catalyzed allylation of a hydroxy-containing aromatic compound with a polyolefin followed by reaction of the alkylation product with an aldehyde and an amine as described in U.S. Pat. No. 5,876,468.

The surfactant can be a hydrocarbyl-substituted carboxylic acid which can comprise a carboxylic acid as described in detail above for a carboxylic acid of the hydrocarbyl-substituted acylating agent, a $C_4$-$C_{30}$ fatty carboxylic acid, a dimer and/or trimer of an unsaturated fatty carboxylic acid, or a mixture thereof. In an embodiment of the invention the hydrocarbyl-substituted carboxylic acid is a hydrocarbyl-substituted acylating agent which is an alkenylsuccinic acid where the alkenyl substituent is derived from a polyisobutylene. The fatty carboxylic acid can have 4 to 30 carbon atoms, 6 to 25 carbon atoms or 8 to 22 carbon atoms. The fatty carboxylic acid can be linear, branched or a mixture thereof. The fatty carboxylic acid can be saturated, unsaturated or a mixture thereof. The fatty carboxylic acid can be a single acid or a mixture of 2 or more acids that differ in carbon number, branching and/or saturation. The dimer and/or trimer of an unsaturated fatty carboxylic acid can be derived from dimerization or trimerization of an unsaturated fatty carboxylic acid having 4 to 30 carbon atoms, 6 to 25 carbon atoms, or 8 to 22 carbon atoms. Useful fatty carboxylic acids and dimer and trimer acids thereof include for example oleic acid, stearic acid, tall oil fatty acid, and dimers and/or trimers of $C_{18}$ unsaturated fatty carboxylic acids. Fatty carboxylic acids and dimers and/or timers of unsaturated fatty carboxylic acids are available commercially from several manufacturers.

The surfactant can be an alkoxylated alcohol, a carboxylate ester of an alkoxylated alcohol, or a mixture thereof. The alcohol can be a monohydric alcohol, a polyhydric alcohol containing 2 or more hydroxy groups such as for example a glycol or glycerol, or a mixture thereof. The alcohol can have 1 to 30 carbon atoms, 4 to 25 carbon atoms, or 6 to 22 carbon atoms. The alcohol can be linear, branched or a mixture thereof. The alcohol can be saturated, unsaturated or a mixture thereof. The alcohol can be a single alcohol or a mixture of two or more alcohols that differ in carbon number, saturation and/or branching. The alkoxylated alcohol can be monoalkoxylated with a single alkylene oxide unit or polyalkoxylated with 2 or more alkylene oxide units. The alkoxylated alcohol can have 1 to 50 alkylene oxide units, 1 to 10 alkylene oxide units or 1 to 5 alkylene oxide units. The alkylene oxide can have 2 to 16 carbon atoms, 2 to 10 carbon atoms or 2 to 6 carbon atoms. The polyalkoxylated alcohol can be derived from a single alkylene oxide or from 2 or more alkylene oxides that differ in carbon number where the 2 or more alkylene oxides can be reacted as a mixture or sequentially with the alcohol. The carboxylate ester of an alkoxylated alcohol can be obtained by reacting an alkoxylated alcohol with a carboxylic acid or reactive equivalent thereof such as an anhydride or ester or acid halide where the carboxylic acid can be a mono- or polycarboxylic acid having per mole of the mono- or polycarboxylic acid 1 to 220 carbon atoms, 1 to 180 carbon atoms, or 1 to 110 carbon atoms. The alkoxylated alcohol and carboxylate ester thereof are commercially available such as for example ethoxylated and/or propoxylated alcohols and/or can be prepared by well known methods.

The surfactant can be an alkoxylated alkylphenol, a carboxylate ester of an alkoxylated alkylphenol, or a mixture thereof. The alkyl substituent of the alkylphenol can be linear, branched or a mixture thereof. The alkyl substituent can be saturated, unsaturated or mixture thereof. The alkyl substituent can have 1 to 180 carbon atoms, 4 to 110 carbon atoms or 7 to 85 carbon atoms. The alkylphenol can be a single alkylphenol or a mixture of 2 or more alkylphenols that differ in carbon number, saturation and/or branching. The alkylphenol can be monoalkoxylated or can be polyalkoxylated with a single alkylene oxide or with 2 or more alkylene oxides as described in detail above for the alkoxylated alcohol. The carboxylate ester of an alkoxylated alkylphenol can be obtained by reacting an alkoxylated alkylphenol with a carboxylic acid or reactive equivalent thereof as described in detail above for the carboxylate ester of an alkoxylated alcohol. The alkoxylated alkylphenol and carboxylate ester thereof are commercially available and/or can be prepared by well known methods.

The surfactant can be an alkoxylated fatty carboxylic acid, a carboxylate ester of an alkoxylated fatty carboxylic acid, or a mixture thereof. The fatty carboxylic acid can have 4 to 30 carbon atoms, and in other instances can have 6 to 25 carbon atoms, or 8 to 22 carbon atoms. The fatty carboxylic acid can be linear, branched or a mixture thereof. The fatty carboxylic acid can be saturated, unsaturated or a mixture thereof. The fatty carboxylic acid can be a single acid or a mixture of 2 or more acids that differ in carbon number, branching and/or saturation. The fatty carboxylic acid can be monoalkoxylated or can be polyalkoxylated with a single alkylene oxide or with 2 or more alkylene oxides as described in detail above for the alkoxylated alcohol. The carboxylate ester of an alkoxylated fatty carboxylic acid can be obtained by reacting an alkoxylated fatty carboxylic acid with a carboxylic acid or reactive equivalent thereof as described in detail above for the carboxylate ester of an alkoxylated alcohol. The alkoxylated fatty carboxylic acid and carboxylate ester thereof are commercially available and/or can be prepared by well known methods.

The surfactant can be a fatty carboxylic acid ester. The fatty carboxylic acid or reactive equivalent thereof, to include an anhydride, an ester or an acid halide, can have in the acid portion of the compound 4 to 30 carbon atoms, and in other instances can have 6 to 25 or 8 to 22 carbon atoms. The fatty carboxylic acid can be a single acid or a mixture of 2 or more acids that differ in carbon number, branching and/or saturation as described in detail above for the alkoxylated fatty carboxylic acid. The fatty carboxylic acid ester can be obtained by esterifying or reacting the acid or a reactive equivalent thereof with an alcohol or a reactive equivalent thereof to include an alkene. The alcohol can be a monohydric alcohol, a polyhydric alcohol having 2 or more hydroxy groups, or a mixture thereof. The monohydric alcohol can have 1 to 30 carbon atoms, can be linear or branched or a mixture thereof, and can be saturated or unsaturated or a mixture thereof. The monohydric alcohol can be a single alcohol or a mixture of 2 or more alcohols that differ in carbon number, branching and/or saturation. The polyhydric alcohol can be a glycol, a polyhydroxy alcohol having 3 or more hydroxy groups, or a mixture thereof. The glycol can include for example ethylene glycol, propylene glycol, neopentyl glycol, or mixtures thereof. The polyhydroxy alcohol containing 3 or more hydroxy groups can include for example glycerol and oligomers of glycerol such as a glycerol dimer and trimer, mono- and dipentaerythritol, 1,1,1-tris(hydroxymethyl)alkanes such as 1,1,1-tris(hydroxymethyl)propane, polyhydroxy alcohols derived from monosaccharides such as sorbitol and its cyclic anhydride sorbitan, or mixtures thereof. The polyhydroxy alcohol containing 3 or more hydroxy groups can be alkoxylated as described in detail above for the alkoxylated alcohol. In embodiments of the invention the polyhydroxy alcohol containing 3 or more hydroxy groups can be alkoxylated prior to or following esterification of the fatty carboxylic acid with the polyhydroxy alcohol. Useful fatty carboxylic acid esters can include for example methyl oleate; glycerol mono- or di- or trioleate or mixtures thereof; ethylene glycol mono- or distearate or mixtures thereof; sorbitan mono- or trioleate or mixtures thereof; poly(oxyalkylene) sorbitan esters; triglycerol diisostearate; poly(ethylene glycol) dilaurate where the polyglycol has a 200 molecular weight; or mixtures thereof. The fatty carboxylic acid esters are commercially available and/or can be prepared by well known methods.

The surfactant can be a polymer, copolymer or block copolymer of one or more alkylene oxides. The polymer can be obtained by polymerizing a single alkylene oxide while the copolymer and block copolymer can be obtained by polymerizing 2 or more alkylene oxides that differ in carbon number respectively as a mixture or sequentially. The alkylene oxide can have 2 to 16 carbon atoms, and in other instances can have 2 to 10 or 2 to 6 carbon atoms. The polymer or copolymer or block copolymer can comprise 2 to 50, 2 to 25 or 2 to 10 alkylene oxide units. Useful polymers, copolymers and block copolymers include for example polymers, copolymers and block copolymers from ethylene oxide, propylene oxide, or mixtures thereof. The polymers, copolymers and block copolymers are available commercially and/or can be prepared by well known methods.

The surfactant can be an alkoxylated and/or carboxylated saccharide. The saccharide can comprise a monosaccharide and/or derivative thereof, a disaccharide, or a mixture thereof. The monosaccharide can comprise an aldose, ketose, or mixture thereof. The monosaccharide derivative can comprise a hemiacetal of an aldose, a hemiketal of a ketose, or a mixture thereof. The disaccharide can comprise a dimer of an aldose and/or ketose. Useful saccharides include for example glucose, sucrose, methyl glucoside, or mixtures thereof. The saccharide can be monoalkoxylated or can be polyalkoxylated with a single alkylene oxide or with 2 or more alkylene oxides that differ in carbon number as described in detail above for the alkoxylated alcohol. The saccharide can be carboxylated with one or more fatty carboxylic acid units or a reactive equivalent thereof as described in detail above for the fatty carboxylic acid ester. The saccharide can be both alkoxylated and carboxylated as described above in this paragraph. In an embodiment of the invention the saccharide is first alkoxylated and then carboxylated. In another embodiment of the invention the saccharide is first carboxylated then alkoxylated. Useful alkoxylated and/or carboxylated saccharides include for example methyl glucoside dioleate, methyl glucoside sesquistearate, or mixtures thereof. The alkoxylated and/or carboxylated saccharides are commercially available and/or can be prepared by well known methods.

The surfactant can be an alkoxylated fatty carboxylic acid ester or vegetable oil or animal oil or mixture thereof. The fatty carboxylic acid ester or vegetable oil or animal oil will generally contain one or more reactive hydroxy groups that can be alkoxylated. Useful fatty esters, vegetable oils and animal oils can include for example esters of 12-hydroxystearic acid, esters of polyols containing 1 or more reactive hydroxy groups such a mono- or diglyceride, castor oil, hydrogenated castor oil, or mixtures thereof. The fatty ester or vegetable or animal oil can be monoalkoxylated with a single alkylene oxide unit or polyalkoxylated with 2 or more alkylene oxide units. The alkoxylated fatty ester or vegetable oil or animal oil can have 1 to 50 alkylene oxide units, and in other instances can have 1 to 35 or 1 to 20 alkylene oxide units. The alkylene oxide can have 2 to 16 carbon atoms, and in other instances can have 2 to 10 or 2 to 6 carbon atoms. The polyalkoxylated fatty ester or vegetable oil or animal oil can be derived from a single alkylene oxide or from 2 or more alkylene oxides that differ in carbon number where the 2 or more alkylene oxides can be reacted as a mixture or sequentially with the fatty ester or vegetable oil or animal oil. Useful alkoxylated fatty esters or vegetable oils or animal oils can include for example ethoxylated mono- and diglycerides and mixtures thereof; ethoxylated castor oil; ethoxylated, hydrogenated castor oil; or a mixture thereof. The alkoxylated fatty carboxylic acid esters, vegetable oils and animal oils are commercially available and/or can be prepared by well known methods.

The surfactant in an embodiment of the present invention can be a reaction product of a hydrocarbyl-substituted acylating agent and an amine, an alcohol, or a mixture thereof; a fatty carboxylic acid ester; or a mixture thereof. In another embodiment of the invention the surfactant can be a reaction product of an alkenylsuccinic anhydride and an amine; a fatty carboxylic acid ester of a polyhydric alcohol; or a mixture thereof. The surfactant in a further embodiment of this invention can be a reaction product of an alkenylsuccinic anhydride and an alkanolamine wherein the alkenyl substituent is derived from a polyisobutylene; a sorbitan fatty carboxylic acid ester; or a mixture thereof.

The surfactant can be present in the emulsion composition of the invention in an amount that is sufficient to stabilize the emulsion composition from phase separation after preparation of the emulsion composition and prior to and during its use in a vehicle or ink composition of this invention. The amount of the surfactant present in the emulsion composition can on a weight basis be at 0.1 to 10%, and in other embodiments of the invention can be at 0.3 to 7.5% or at 0.5 to 5%.

The emulsion composition of the present invention can be prepared at ambient or room temperatures, and in other instances can be prepared at 0 to 100° C., 5 to 90° C. or 10 to 80° C. The emulsion composition can be prepared by simply combining the components of the emulsion in any order of addition. To make the process for the preparation of the emulsion more efficient using as an example a water-in-oil emulsion, the surfactant can initially be dissolved in the outer or oil phase and then the inner or water phase can gradually be combined with the solution of the surfactant and outer phase.

To prepare a more stable emulsion the components can be stirred or mixed as they are combined using a stirrer which can be a high speed stirrer. The stirring rate of the stirrer on a revolutions per minute basis can be at 1,000 to 500,000, and in other instances can be at 10,000 to 300,000 or 20,000 to 150,000. The length of time needed for stirring the components to form a stable emulsion will generally be until the inner phase comprises droplets having a mean diameter of 0.1 to 10 microns.

The emulsion composition of the present invention can comprise one or more additional components as described hereinbelow for the components of the vehicle composition and the ink composition.

The present invention further comprises a vehicle composition comprising the emulsion composition of this invention as described throughout this application, and a resin wherein the emulsion composition can be present at 6 to 99% by weight, and the resin is suitable for use in a printing ink composition and is present at 1 to 70% by weight. The resin is generally a natural or synthetic organic material that provides performance benefits to a printing ink composition to include carrying the ink colorant and binding the ink colorant to the printed substrate. The resin can comprise a natural resin, a synthetic resin, or a mixture thereof. The resin can comprise a single resin or a mixture of 2 or more resins to include for example a single natural or synthetic resin, 2 or more natural resins, 2 or more synthetic resins, or 2 or more of a mixture of natural and synthetic resins. Natural resins can comprise various organic materials from plants and animals to include for example rosin, balsam and shellac. Synthetic resins can comprise a synthetic polymer, a modified natural resin, or a mixture thereof. The synthetic polymer can comprise a thermoplastic polymer, a thermosetting polymer, or a mixture thereof. Synthetic polymers can include for example hydrocarbon resins, poly(vinyl halides), styrene-maleic anhydride copolymers, polyamides, ketone-formaldehyde condensates, acrylic resins, epoxy resins, phenolic resins, polyolefins, polyester resins, urea- and melamine-formaldehyde resins, terpene resins, or mixtures thereof. Modified natural resins can include for example modified drying oils such as oil modified alkyd resins, metal resinates from rosins, cellulosics, rosin esters, rosin-modified phenolic resins, rosin-modified fumaric and/or maleic resins, rosin dimers and polymers, or mixtures thereof. In an embodiment of the invention the resin can comprise a rosin ester, a polyester resin, a phenolic resin, a rosin-modified phenolic resin, a modified drying oil, a hydrocarbon resin, a terpene resin, a rosin-modified maleic and/or fumaric resin, or a mixture thereof.

The emulsion composition can be present in the vehicle composition on a weight basis at 6 to 99%, and in other instances at 6 to 85%, or at 8 to 75% or at 8 to 50% or at 8 to 30%. The resin can be present in the vehicle composition on a weight basis at 1 to 70%, and in other instances at 7 to 50%, or at 10 to 45% or at 25 to 45% or at 35 to 45%. The surfactant can be present in the vehicle composition on a weight basis at 0.006 to 9.9%, and in other instances at 0.006 to 8.5%, or at 0.008 to 7.5% or at 0.008 to 5% or at 0.008 to 3%.

The vehicle composition can further comprise a component selected from the group consisting of an organic solvent, a drying oil, a drier, an additive, or a mixture thereof. The organic solvent can comprise the organic solvent of component (b) of the emulsion composition as described in detail hereinabove. The drying oil can comprise a plant or vegetable oil to include for example linseed, tung, dehydrated castor, safflower, soybean, tall, oiticia, or mixtures thereof. The drier is a catalyst that can include one or more metal carboxylate salts and that can decrease the drying time for inks that contain a drying oil. The additive can comprise a plasticizer such as for example a phthalate to improve flexibility and adhesion of an ink; a wax such as for example beeswax, carnauba, paraffin, polyethylene, polytetrafluoroethylene, or mixtures thereof which can improve slip and scuff/rub resistance; a wetting agent to improve dispersion of a colorant in a vehicle or ink; a defoamer; an antioxidant to prevent skin formation in an ink; a corrosion inhibitor; a biocide; a deodorant; a shortening compound to prevent misting; a reducer such as for example a wax or petroleum solvent to reduce ink tack; a stiffening agent to stiffen an ink; or a mixture thereof. In an embodiment of the invention the vehicle composition can further comprise an organic solvent, a wax, or a mixture thereof. In a further embodiment of the invention the vehicle composition can further comprise a heatset oil having a boiling point range of 215 to 325° C., a wax, or a mixture thereof.

The present invention further comprises an ink composition comprising the emulsion composition of this invention as described throughout this application; the resin component of the vehicle composition of this invention as described throughout this application; and a colorant wherein the emulsion composition delivers 5 to 35% by weight water to the ink composition. The emulsion composition can deliver to the ink composition on a weight basis 5 to 35% water, and in other instances can deliver 5 to 28% water, or 5 to 22% water. A colorant is generally a finely ground solid organic or inorganic material that is usually insoluble in an ink and that imparts color to the ink. A colorant can comprise a pigment, a dye, a toner, or a mixture thereof. In an embodiment of the invention the colorant is a pigment, a dye, or a mixture thereof where the colorant is insoluble in the ink. The colorant can further comprise an extender to include for example kaolin clay, calcium carbonate, silica, talc, or a mixture thereof where the extender is a white pigment used to reduce the strength or improve the properties of a colorant. In an embodiment of the invention the colorant is a pigment. The pigment can comprise an inorganic pigment, an organic pigment, or a mixture thereof. The inorganic pigment can comprise a white pigment to include titanium dioxide; a colored pigment to include iron blue and ultramarine blue; or a mixture thereof. The organic pigment can comprise a black pigment to include furnace blacks; a colored pigment to include diarylide yellow, hansa yellow, phthalocyanine blue, reflex blue, rubine, rhodamine, red lake C, or a mixture thereof; or a mixture thereof.

The ink composition can further comprise a component, as described in detail hereinabove for the vehicle composition, selected from the group consisting of an organic solvent, a drying oil, a drier, an additive, or a mixture thereof. In an embodiment of the invention the ink composition can further comprise an organic solvent, a wax, or a mixture thereof wherein the organic solvent is a heatset oil having a boiling point range of 215 to 325° C.

The ink composition of this invention can comprise on a weight basis the surfactant at 0.03 to 5%, at 0.06 to 2.5% or at 0.08 to 1.5%; the hydrocarbon distillate having a boiling point range of 215 to 325° C. at 5 to 40%, at 5 to 30% or at 5 to 20%; the resin at 20 to 50%, at 25 to 45% or at 30 to 40%; and the colorant at 10 to 40%, at 15 to 35% or at 20 to 30%.

The ink composition in an embodiment of the invention is a lithographic printing ink composition, and in other embodiments is a heatset lithographic printing ink composition, a heatset web lithographic printing ink composition wherein the web is a continuously fed roll of the substrate instead of individually fed pieces or sheets, a quickset sheetfed lithographic printing ink composition, or a nonheatset web lithographic printing ink composition.

The vehicle composition and ink composition of the present invention can be prepared at ambient or room temperature, and in other instances at 0 to 100° C., at 5 to 90° C., or at 10 to 80° C. Although the vehicle and ink compositions can be prepared by simply combining components in any order, they are normally prepared by well known methods in which components are combined in an order that facilitates the preparation process in terms of dissolving or dispersing components using a high speed stirrer or mixer where for ink preparation a mill can also be used. In an embodiment of the invention an emulsion composition is added with stirring at ambient temperature to a previously prepared ink composition. In another embodiment of the invention the emulsion composition is added as indicated above to the previously prepared ink composition except that an amount of organic solvent is withheld in the preparation of the ink composition that is equal to the amount of emulsion composition added. In a further embodiment of the invention an emulsion composition is added with stirring at ambient temperature to a previously prepared vehicle composition and then an ink composition is prepared from this vehicle composition that contains the emulsion. In a still further embodiment of the invention the emulsion composition is added to the previously prepared vehicle composition followed by preparation of the ink composition as indicated above except that an amount of organic solvent is withheld in the preparation of the vehicle composition that is equal to the amount of emulsion composition added.

The present invention further comprises a lithographic printing process comprising employing in the printing process an ink composition comprising as described in detail throughout this application a) an emulsion composition, or b) a vehicle composition comprising an emulsion composition and a resin, or c) an ink composition comprising an emulsion composition, a resin, and a colorant. The lithographic printing process in embodiments of the invention can employ a heatset lithographic printing ink composition, or a heatset web lithographic printing ink composition. A lithographic printing process employing a conventional ink, in which an emulsion composition is not added, normally includes an aqueous dampening solution which is introduced at a certain rate so that an image of proper intensity and definition is printed on the substrate. In embodiments of this invention a lithographic printing process as described throughout this application comprises employing in the printing process an ink composition comprising an emulsion composition as described throughout this application wherein the rate of introduction of an aqueous dampening solution can be at the same rate as that for a conventional ink or at a reduced rate of introduction. This reduced rate of introduction, in embodiments of the invention, can be a reduction in the rate from that for a conventional ink by 90%, 60%, 40%, 30%, 20%, 10% or 0% (no reduction) or from 0 to 90%, 5 to 90%, 0 to 70%, 5 to 70%, 0 to 50%, or 5 to 50%. In an embodiment of the invention a method to improve a lithographic printing process comprises employing in the printing process as described throughout this application an ink composition comprising an emulsion composition as described throughout this application. In the method of the present invention the lithographic printing process uses an emulsion-containing ink and unexpectedly produces a printed image nearly equivalent or equivalent in quality to a printed image from a conventional ink and additionally a number of advantages compared to the conventional ink. The advantages can include a reduction in VOC equivalent to the amount of organic solvent eliminated by using the emulsion, a reduction in energy required to dry the ink, and a substantially reduced time (reduced by greater than 50%, 70% or 90% compared to conventional ink) at start-up to establish the quality of the print image which results in saving time, energy and substrate.

EXAMPLES

The following examples demonstrate the unexpected performance and benefits of the present invention and are not intended to and should not be used to limit the scope of the invention.

Example 1

Comparative

A conventional heatset lithographic ink is prepared from commercially available components and contained on a weight basis 35% of a heatset flush, 50% of a heatset vehicle, 6% of a wax compound, 1% of a polytetrafluoroethylene compound, and 8% of a reducer. This conventional heatset lithographic ink is run as a single color press sheet on a lithographic printing press to establish a base line print and printing conditions for comparison to ink compositions of the present invention. The percent amounts for the heatset flush, heatset vehicle, wax compound, and polytetrafluoroethylene compound include both actives and diluent.

Example 2

The conventional ink of Example 1 containing an emulsion of the present invention, that delivers 9.9 wt. % water to the ink, is run on the lithographic printing press under the same conditions established in Example 1. The composition of this emulsion containing ink is the same as the conventional ink of Example 1 except that 22 wt. % of the solvent in the heatset vehicle is replaced by an emulsion that is prepared using a high speed blender and that contains on a wt. basis 90% water, 7.5% heatset oil, 0.5% sorbitan monooleate, and 2% of a reaction product of a polyisobutenylsuccinic anhydride and N,N-diethylethanolamine reacted in a wt. ratio of respectively 1000:209 where the polyisobutenyl substituent is derived from a 1000 number average molecular weight polyisobutylene. The intensity and definition, based on density and dot gain measurements, of the printed image from the emulsion ink are nearly equivalent to those of the image from the conventional ink. The image from the emulsion ink is slightly less defined based on a dot gain of 12.4% relative to a dot gain of 10.7% for the conventional ink. The emulsion ink reaches target intensity (density) substantially sooner than the conventional ink, indicating savings in terms of time and energy and substrate wastage, and maintains excellent press stability.

Example 3

The emulsion ink of Example 2 containing 9.9 wt. % water is run on the lithographic printing press under the same conditions established in Example 1 except that the rate of introduction of the aqueous dampening solution is reduced (the amount of the reduction is less than 50%). The intensity and definition, based on density and dot gain measurements, of the printed image from the emulsion ink are nearly equivalent to those of the image from the conventional ink. The image from the emulsion ink is slightly less defined based on a dot gain of 13.5% relative to a dot gain of 10.7% for the conventional ink. The emulsion ink reaches target intensity (density) substantially sooner than the conventional ink and maintains excellent press stability.

Example 4

An emulsion ink is prepared that is the same as the emulsion ink of Example 2 except that the 2% reaction product from polyisobutenylsuccinic anhydride and diethylethanolamine is replaced by 2% sorbitan monooleate.

Example 5

An emulsion ink is prepared that is the same as the emulsion ink of Example 2 except that the 0.5% sorbitan monooleate is replaced by 0.5% reaction product from polyisobutenylsuccinic anhydride and diethylethanolamine.

Each of the documents referred to in this Detailed Description of the Invention section is incorporated herein by reference. All numerical quantities in this application used to describe or claim the present invention are understood to be modified by the word "about" except for the examples or where explicitly indicated otherwise. All chemical treatments or contents throughout this application regarding the present invention are understood to be as actives unless indicated otherwise even though solvents or diluents may be present.

What is claimed is:

1. A lithographic printing process, comprising:
   employing an ink composition in a lithographic printing process to form an image, wherein said lithographic printing process includes an image area which is ink receptive and a hydrophilic or water receptive non-image area which is wetted with an aqueous dampening solution, said ink composition comprising an emulsion composition comprising
   (a) water;
   (b) a hydrocarbon distillate having a boiling point range of 215 to 325° C.; and
   (c) at least one emulsion stabilizing surfactant having a HLB number of 10 or less wherein the water is present at 10 to 99% by weight, the hydrocarbon distillate is present at less than 90% by weight, and the surfactant is present at 0.1 to 10% by weight.

2. The lithographic printing process of claim 1, wherein the hydrocarbon distillate is a heatset oil.

3. The lithographic printing process of claim 1, wherein the water of component (a) comprises droplets having a mean diameter of 0.05 to 10 microns.

4. The lithographic printing process of claim 1, wherein the surfactant has a HLB number from 0.1 to 7.5.

5. A lithographic printing process, comprising:
   employing an ink composition in a lithographic printing process to form an image, wherein said lithographic printing process includes an image area which is ink receptive and a hydrophilic or water receptive non-image area which is wetted with an aqueous dampening solution, said ink composition, comprising:
   (a) water;
   (b) an oil comprising a hydrocarbon distillate having a boiling point range of 215 to 325° C., a mineral oil, a vegetable oil, or a mixture thereof; and
   (c) at least one emulsion stabilizing surfactant having a HLB number from 0.1 to 10 wherein components (a), (b) and (c) form an emulsion composition; the water is present at 10 to 99% by weight; the oil is present at less than 90% by weight; the surfactant is present at 0.1 to 10% by weight;
   a resin; and
   a colorant
   wherein the emulsion composition delivers 5 to 35% by weight water to the ink composition, the surfactant is present at 0.03 to 5% by weight, the oil is present at 5 to 75% by weight, the resin is present at 1 to 50% by weight, and the colorant is present at 1 to 30% by weight based on the weight of the emulsion.

6. The lithographic printing process of claim 1, wherein the water is present at 40 to 98% by weight, and the hydrocarbon distillate is present at less than 60% by weight.

7. The lithographic printing process of claim 1, wherein the surfactant comprises a reaction product of a hydrocarbyl-substituted acylating agent and an amine, an alcohol, or a mixture thereof; a Mannich reaction product of hydrocarbyl-substituted hydroxy-containing aromatic compound, an aldehyde, and an amine containing at least one primary or secondary amino group; a hydrocarbyl-substituted carboxylic acid; an alkoxylated alcohol, a carboxylate ester of an alkoxylated alcohol, or a mixture thereof; an alkoxylated alkylphenol, a carboxylate ester of an alkoxylated alkylphenol, or a mixture thereof; an alkoxylated fatty carboxylic acid, a carboxylate ester of an alkoxylated fatty carboxylic acid, or a mixture thereof; a fatty carboxylic acid ester; a polymer, copolymer or block copolymer of one or more alkylene oxides; an alkoxylated and/or carboxylated saccharide; an alkoxylated fatty carboxylic acid ester or vegetable oil or animal oil or mixture thereof; an amine; an alkoxylated amine; an amide; an alkoxylated amide; an alkanolamide; an alcohol; a sulfonate; an amine oxide; a betaine compound; an imidazoline; a phosphate ester; lignin or a derivative thereof; a quaternary ammonium salt; a sulfate; a sulfosuccinate or derivative thereof; a soap; a copolymer of a poly(oxyalkylene glycol) and a poly(12-hydroxystearic acid); or a mixture thereof.

8. The lithographic printing process of claim 1, wherein the surfactant comprises a reaction product of an alkenylsuccinic anhydride and an alkanolamine wherein the alkenyl substituent is derived from a polyisobutylene; a sorbitan fatty carboxylic acid ester; or a mixture thereof.

9. The lithographic printing process of claim 1, wherein said ink composition further comprises a resin and a colorant.

10. The lithographic printing process of claim 9, wherein said ink further comprises an organic solvent, a drying oil, a drier, and additive, or a mixture thereof.

11. The lithographic printing process of claim 8, wherein said ink further comprises a resin and a colorant.

12. The lithographic printing process of claim 1, wherein said emulsion composition delivers 5 to 35% by weight water to the ink composition.

13. The lithographic printing process of claim 9, wherein said surfactant is present at 0.03% to 5% by weight, the hydrocarbon distillate is present at 5 to 40% by weight, the resin is present at 20 to 50% by weight, and the colorant is present at 10 to 40% by weight.

* * * * *